June 17, 1952  R. W. HELWIG  2,600,871
CONTINUOUS CONVEYER-REACTOR CHAMBER
Filed June 27, 1949  2 SHEETS—SHEET 2
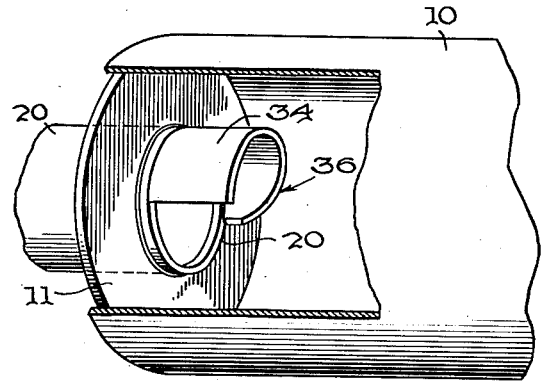
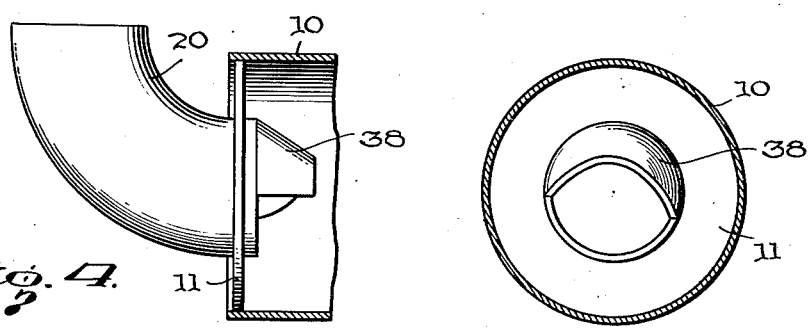
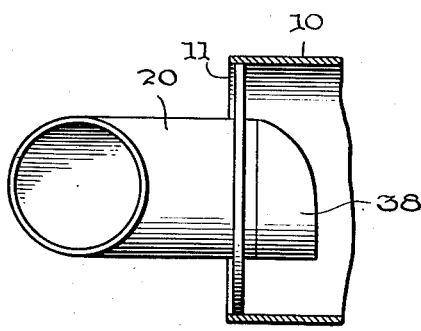
INVENTOR.
RALPH W. HELWIG
BY
his ATTORNEY Patented June 17, 1952

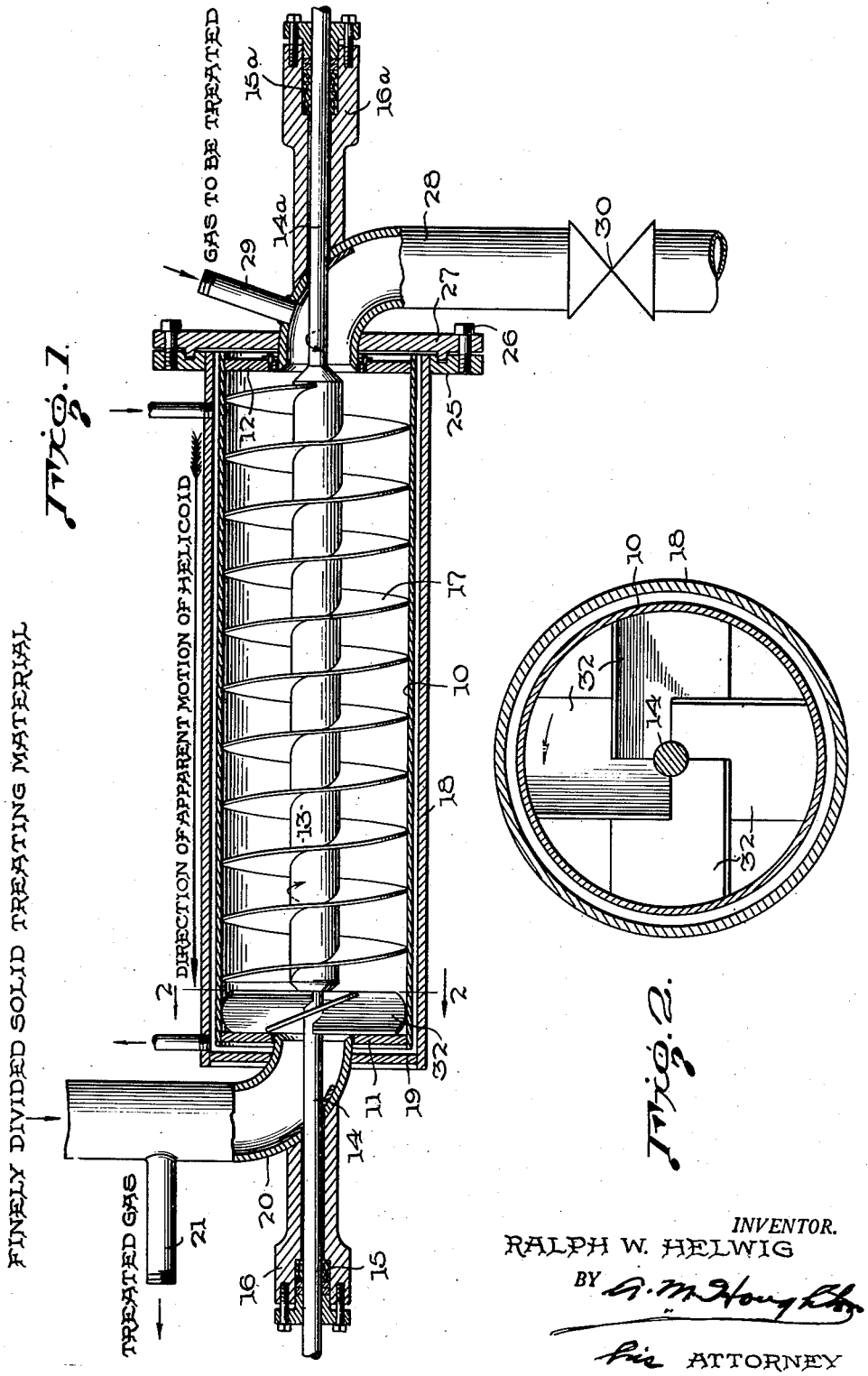

2,600,871

UNITED STATES PATENT OFFICE 2,600,871

CONTINUOUS CONVEYER-REACTOR CHAMBER

Ralph W. Helwig, Verona, Pa., assignor to Gulf Research & Development Company, Pittsburgh, Pa., a corporation of Delaware Application June 27, 1949, Serial No. 101,593

8 Claims. (Cl. 23—285)

This invention relates to an improved apparatus for carrying out chemical reactions, wherein a fluid and a particulate solid treating material are continuously brought into intimate contact in a generally helicoidal zone of contact to effect a chemical reaction. The invention deals particularly with an improvement in the apparatus disclosed in copending application, Serial No. 688,390, filed on August 5, 1946, by William C. Offutt, Merald C. Fogle and the present inventor, now U. S. Patent 2,517,339 and assigned to the assignee of the present application.

The above mentioned application discloses and claims a process and apparatus for effecting chemical reactions between a fluid and a non-fluidized solid particulate treating material, in which the solid material is caused to flow continuously in a substantially helical path through a reaction zone, and a stream of fluid is simultaneously passed in a substantially helical path through said reaction zone and in contact with said treating material. Specifically, a preferred apparatus disclosed in said prior application comprises a generally cylindrical shell or vessel which is mounted for rotation about its longitudinal axis and which is interiorly provided with a helicoid, the periphery of which is contiguous or attached to the inner wall surfaces of the vessel, the whole rotating as a unit and without relative movement between the shell or vessel and the helicoid. Means are provided for introducing a stream of fluid at one end of the cylindrical vessel and for removing it from the other end of the vessel, the disposition of the fluid inlet and outlet, respectively, depending upon whether it is desired to pass the fluid through the vessel in a direction concurrent with or countercurrent to the direction of transport of the particulate treating agent through the vessel. Means are also provided for introducing a solid particulate treating agent into one end of the vessel and for removing it from the opposite end of the vessel. The inlet and outlet for the particulate treating agent are disposed at such ends of the vessel with respect to the helicoid and the direction of rotation of the vessel, i. e., clockwise or counterclockwise, that upon rotation of the vessel and the helicoid the whorls of the helicoid will have an apparent direction of movement away from the outlet means and toward the inlet means. The particulate treating agent is then moved by the rotating vessel through the vessel in a direction opposite to the apparent direction of movement of the helicoid. For example, in a horizontally disposed vessel having its principal axis normal to the line of vision of an observer, if the helicoid is in the form of a right-hand screw and appears to rotate clockwise when viewed from the end at the right of the observer, the whorls of the helicoid nearest the observer will appear to travel from the left to the right of the observer. In such case, the inlet for treating agent is disposed at the right end of the vessel and helicoid, and the outlet is disposed at the left. Under the same conditions of observation, if the helicoid is in the form of a right-hand screw and appears to rotate counterclockwise, then the inlet would be disposed at the left end and the outlet at the right because the whorls of the helicoid then appear to move from right to left. Under the same conditions of observation, if the helicoid is in the form of a left-hand screw and appears to rotate clockwise, the whorls of the helicoid nearest the observer appear to move from right to left, and the inlet is disposed at the left end and the outlet at the right. Again under the same conditions of observation, if the helicoid is in the form of a left-hand screw and appears to rotate counterclockwise, then the whorls appear to move from left to right, and the inlet is disposed at the right end and the outlet at the left.

As further disclosed in said prior application, it is advantageous to provide a central core or shaft coaxially disposed within the rotating vessel. By means of such a core, maximum uniformity of contact between the fluid and particulate treating agent can be secured. The size of the core relative to the size of the vessel may be varied over a wide range, and in general it is desirable to employ a core having a cross-sectional area of from 10 to 50 per cent of the cross-sectional area of the vessel. The degree of loading of particulate treating agent in the vessel, which is normally slightly in excess of 50 per cent of the free volume of the vessel, may be increased by restricting the flow of particulate treating agent from the discharge end of the vessel by means of an adjustable orifice, such as a valve or the like.

For a complete description of the construction and operation of apparatus of the type described, reference is made to the prior application referred to hereinabove.

In the operation of the invention in accordance with the prior application, the particulate treating material falls by gravity into the space within the vessel between the inlet end and the first whorl of the helicoid. Since the apparent direction of motion of the helicoid is toward the inlet end, this results in a piling up of the particulate material in the said space until sufficient has accumulated to pass over the axis of the helicoid or the core, if a core is provided, and thence into the space between the first and second whorls, and this action continues until, ultimately, particulate material has traveled through the complete path defined by the helicoid and leaves the apparatus by the outlet opening at the opposite end of the reaction vessel. The rate at which solid particulate treating material passes through the vessel normally varies over a wide range, depending on the loading, the pitch of the helicoid, the speed of rotation and other factors described in the prior application.

In normal operation, an unrestricted supply of solid particulate treating agent is provided at the inlet end, and the outlet rate at the opposite end of the vessel is maintained at the desired value, as by a valve mechanism or the like. Since, for reasons of practical construction, the inlet opening for particulate treating material is appreciably smaller than the diameter of the vessel itself, the rate of feeding of the solid material tends to be restricted by the solids already in the vessel. This restricted action results from the fact that the solids can only move away from the inlet end by accumulating to a depth sufficient to cause a part of them to roll over the center axis or core and thus become deflected by the helicoidal member toward the outlet end. Before the solids accumulate to this required depth adjacent the inlet opening, they necessarily roll back upon themselves and partly block the inlet opening, thus reducing its capacity to feed more solids to the vessel. Under many conditions of operation, this blocking action may be great enough to restrict the average capacity of the inlet port to a value lower than the desired throughput of the case. The inlet port, rather than the outlet port, or the valve associated with the latter, then restricts the particulate solids capacity of the apparatus, and as a result the loading drops down from the desired high value to one which may approach 50 per cent. Such a situation will obviously often be undesirable.

It is a principal object of the present invention to provide a means by which the rate of admission of solid treating material to apparatus of this type is rendered substantially independent of the limiting factor discussed in the preceding paragraph.

Another object of the invention is to provide a treatment apparatus of this general character in which the admission of solid treating materials will be expedited, but without the necessity of enlarging the size of the inlet port.

A further object of the invention is to modify the design of chemical treatment apparatus to accomplish the above ends, with a minimum of mechanical modification and alteration, and without unduly increasing the size, complexity or cost of such equipment.

The above and other objects, and the manner in which they are accomplished, will best be understood by reference to the following detailed specification of certain preferred embodiments of the invention, taken in connection with the accompanying drawings forming a part hereof and in which drawings:

Fig. 1 is a side elevation, with parts broken away and partly in section, of a preferred embodiment of the invention;

Fig. 2 is a sectional view taken on line 2—2 of Fig. 1;

Fig. 3 is a perspective view, with parts omitted for clarity and parts broken away, of a second embodiment of the invention;

Fig. 4 is a fragmentary elevational view, partly in section, of another modification;

Fig. 5 is a side view thereof, and

Fig. 6 is a plan view of the same modification.

Referring now to Figs. 1 and 2 of the drawings, there is illustrated a treatment apparatus of the kind described in detail in the copending application referred to above, adapted to effect contact between fluids and finely divided or granular solid catalyst or other solid particulate treating agent or material with continuous flow of the fluid and particulate treating material. As shown in the drawings, the apparatus comprises a vessel or shell 10 of generally cylindrical configuration, disposed with its principal axis in a horizontal plane and having end closure members 11 and 12. The vessel 10 is, in the instance shown, interiorly provided with a coaxially disposed core 13, which may be either hollow or solid, and which extends throughout the major portion of the length of the vessel 10. The core 13 is mounted upon extensions or shaft members 14 and 14a which are suitably supported in bearings 15 and 15a located in bearing housings 16 and 16a, respectively. In the annular space between the core 13 and the casing 10 there is mounted on the core a helicoid 17, the periphery of which is contiguous to and integrally attached to the interior wall surfaces of the vessel 10. The vessel 10, core 13, shaft members 14 and 14a, and helicoid 17 rotate as a unit.

The vessel or shell 10 is located within a stationary outer casing 18 of cylindrical configuration. As disclosed in the prior copending application hereinabove identified, in many cases it is desirable or advantageous to provide for passing a fluid heat-controlling medium such as water, oil, air, steam or the like into or through the space between the rotating vessel 10 and the stationary outer casing 18, whereby the temperature within the vessel 10 may be regulated. The purpose may be either to supply or remove heat. The outer casing 18 is provided at one end with a closure member 19 to which is integrally attached a conduit 20 adapted to serve as a means for feeding particulate treating agent into the interior of the inner shell or vessel 10. A conduit 21, terminating in the conduit 20, is provided for the removal (or introduction, as the case may be) of fluids, such as vaporized or gaseous hydrocarbons, for example. The bearing housing 16 at this end of the apparatus may, as shown, be integrally connected to the conduit 20.

At the opposite end of the apparatus, the outer casing 18 is provided with a flange 25 which is secured by bolts or other suitable fastening devices 26 to an end or closure member 27, to which is attached a conduit 28 terminating coaxially with the vessel 10 in or near the plane of the end member 12 and providing an outlet port for treating agent from the vessel 10. The bearing housing 16a supporting the shaft member 14a at this end of the apparatus is conveniently integrally attached to the conduit 28, and the latter is also provided with an intercommunicating conduit 29 serving to introduce fluid into the interior of the rotating vessel 10 (or, as the case may be, to remove such fluid from the vessel 10). The conduit 28 is also provided with a valve 30 for regulating the flow of treating agent. The right-hand end of helicoid 17, as seen in Fig. 1 of the drawings, is spaced a short distance from the conduit 28 in order to prevent it from interfering with the movement of the particulate treating agent out of the interior of the vessel 10. The left-hand end of helicoid 17, however, terminates a sufficient distance inside of the end plate 11 to accommodate the improvement of the present invention, which in the present case is a shield comprising a set of four broad-bladed propeller-type fins 32 secured to shaft 14, successive blades being spaced at substantially 90 degree angles to one another. The projected width of these blades or fins, as shown in Fig. 2 of the drawings, is preferably only slightly greater than the diameter of the inlet port from conduit 20, and the pitch of the blades is made relatively small so that they do not occupy too large a portion of the vessel. As shown in Fig. 1, the slope of the fins or blades is in the same direction as that of the helicoid 17.

In operation, rotation of shaft 14, 14a rotates the helicoid 17 in the direction of the arrows in Fig. 1, and the blades or fins 32 rotate in the same sense therewith. Solids entering via conduit 20 build up in vessel 10 about the blades 32 to a depth sufficient to permit them to roll over the shaft carrying the fins 32, which then deflect such solids away from the inlet opening, permitting more solids to enter by gravity. In other words, the blades 32 deflect the solids continuously away from the inlet port as they roll over the shaft so that the amount of solids allowed to enter is not restricted by the solids already in the vessel. While the device just described is provided with four blades, it is apparent that the same result can be achieved with more or fewer blades arranged in various ways, so long as the assembly operates to direct incoming solids away from the inlet port.

Fig. 3 of the drawings illustrates diagrammatically a second form of the invention, comprising a stationary shield 34 fixedly secured about the periphery of the inlet port of the solids conduit 20. The lower forward edge of shield 34 is inclined as at 36 in the same direction as the pitch of the helicoid with which it is used, and while this form of the invention does not impart any forward motion to particles entering through the port, it does prevent such particles from rolling directly across the inlet opening and blocking the passage of more material into the vessel.

In Figs. 4 to 6 of the drawing there are shown three views of another stationary type of shield similar in application and position to the one shown in Fig. 3. In this instance, however, the shield 38, which is fixedly secured about the periphery of the inlet port, is inclined to the direction of the axis of the helicoid, and this sloping surface imparts some forward motion to the solid particles as they roll down across it.

As in the above-identified copending application, the apparatus of this invention is useful for a wide variety of chemical reactions wherein a fluid is contacted with a solid particulate treating agent. These include various hydrocarbon treatments, such as cracking, coking, desulfurization, hydrogenation, dehydrogenation, polymerization, isomerization, etc. of hydrocarbons, as well as chemical syntheses. The apparatus of the invention achieves uniform, intimate and efficient contact between the solid treating agent and the fluid to be treated, and at the same time minimizes grinding and pulverizing of the solid treating agent and wear and abrasion of the apparatus.

While there have been disclosed herein certain exemplary embodiments of the invention which have been found satisfactory in solving the problem, it is apparent that many other arrangements may be devised to provide for increasing the degree of loading of the vessel 10, in the presence of an inlet port of smaller diameter than that of the vessel itself, by reducing the tendency of the solids already in the vessel to block the ingress of additional solids due to their rolling in front of said inlet port, and all such arrangements as fall within the scope of the appended claims are considered a part of this invention.

What I claim is:

1. Apparatus for effecting a chemical reaction wherein a fluid is treated with a solid particulate treating agent, comprising: a closed cylindrical shell; a helicoid coaxially disposed within said shell and attached at its periphery to the inner wall of said shell; means for rotating said shell and helicoid as a unit about their common principal axes; inlet means for introducing said treating agent at one end of said shell, said inlet means being so positioned with respect to the helicoid that upon rotation of said shell and helicoid, the helicoid will have an apparent longitudinal movement along its principal axis toward said inlet means; outlet means for withdrawing treating agent disposed at the opposite end of said shell from said inlet means; means for introducing fluid at one end of said shell and for withdrawing treated fluid at the other end; and a shield member mounted within said shell between said inlet means and said helicoid, with at least a portion of said shield member lying above the axis of rotation of said helicoid and having a width substantially coextensive with the diameter of said inlet means, said shield member preventing the particulate treating agent lying within said shell from rolling across the inlet means and blocking the passage of more particulate treating agent into said shell.

2. Apparatus in accordance with claim 1 in which said shield member comprises a shield element fixedly secured about said inlet means.

3. Apparatus in accordance with claim 1 in which said shield member comprises a set of propeller-type fins arranged for rotation with said shell and said helicoid as a unit.

4. Apparatus in accordance with claim 1 in which the shield member is provided with at least one surface inclined to the direction of the axis of rotation of said helicoid.

5. Apparatus for effecting chemical reactions wherein a fluid is treated with a solid particulate treating agent, comprising: a closed cylindrical shell; a core member coaxially disposed within said shell; a helicoid coaxially disposed within said shell, attached at its periphery to the inner wall of said shell and mounted on said core member; means for rotating said shell, core member and helicoid as a unit about their common axes; means defining an inlet port for introducing said treating agent at one end of said shell, said port defining means being so disposed with reference to the helicoid that upon rotation of the latter, the helicoid will have an apparent longitudinal movement along its principal axis toward said inlet port; a solid particulate material directing element positioned adjacent said inlet port and within said shell, with at least a portion of said solid particulate material directing element lying above the axis of rotation of said helicoid and having a width substantially coextensive with the diameter of said inlet port, said solid particulate material directing element preventing the particulate treating agent lying within said shell from rolling across the inlet port and blocking the passage of more particulate treating agent into said shell; and means for withdrawing treating agent from that end of said shell opposite to said directing element.

6. Apparatus in accordance with claim 5 in which said directing element comprises a shield element fixedly secured about said inlet port.

7. Apparatus in accordance with claim 5 in which said directing element comprises bladed propeller-type fins fixedly secured for rotation with said shell and said helicoid and arranged to sweep across said port.

8. Apparatus in accordance with claim 5 in which said directing element is provided with at least one surface inclined to the direction of the axis of rotation of said helicoid.

RALPH W. HELWIG.

REFERENCES CITED

The following references are of record in the file of this patent:

UNITED STATES PATENTS

| Number | Name | Date |
|---|---|---|
| 891,468 | Dougan | June 23, 1908 |
| 2,264,390 | Levine et al. | Dec. 2, 1941 |
| 2,337,137 | Thompson et al. | Dec. 21, 1943 |